Figure 1:
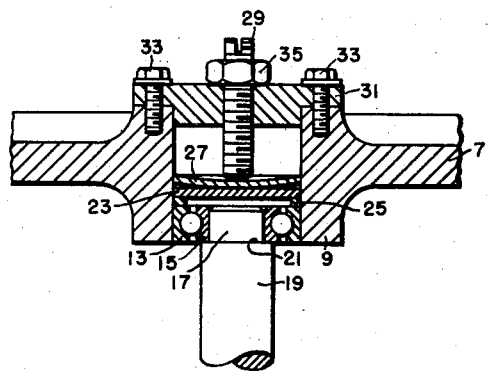

Oct. 28, 1958  P. J. KIEFER, JR  2,857,765
ROTATABLE MECHANICAL DEVICE
Filed Aug. 11, 1954

WITNESSES
Edwin E. Bassler
E. F. Oberheim

INVENTOR
Paul J. Kiefer, Jr.
BY
Paul E. Friedemann
ATTORNEY 2,857,765
Patented Oct. 28, 1958

2,857,765
ROTATABLE MECHANICAL DEVICE

Paul J. Kiefer, Jr., Annapolis, Md., assignor to Westinghouse Electric Corporation, East Pittsburgh, Pa., a corporation of Pennsylvania Application August 11, 1954, Serial No. 449,149

9 Claims. (Cl. 74—5)

This invention relates generally to rotatable mechanical apparatus and particularly to such apparatus including bearing assemblies providing preloading arrangements.

The invention is herein illustrated by way of example, but without limitation, as a gyroscope device equipped with a novel arrangement for journaling the shaft of the gyroscope rotor. This arrangement is equally and preferably applicable in journaling the gyro gimbal on its support. In use gyroscopes are subject to a wide variety of environmental conditions which adversely affect their sensing capabilities. Applications of this type require very delicate adjustment of the amount of preloading of the bearings. In addition allowance must be made for thermal expansion and the bearing construction must be rugged enough to withstand large accelerations.

The accuracy of a sensing instrumentality of this type, as is well known in the art, depends largely upon the fineness of the bearings. However, the very nature of its applications, while requiring high accuracy, at the same time require an extremely durable construction capable of accurate performance in the presence of high acceleration forces, whether resulting from impact or from vibration.

Previous bearing arrangements have not met all the enumerated requirements. Arrangements which appeared satisfactory from the viewpoint of adjustment and thermal expansion proved unsatisfactory in the presence of vibration. Similarly, when durability with respect to vibration was built into the bearing arrangements, adjustment became difficult and the amount of preloading of the bearing arrangement tended to drift in use.

Accordingly, one object of this invention is to provide a bearing arrangement having novel preload features.

Another object of this invention is to provide a bearing assembly having adjustable preload arrangements which are accurately adjustable and which remain in preset adjustment.

Further to the preceding object, it is an object hereof to provide a bearing assembly, having adjustable preload arrangements, which is rugged and capable of withstanding high acceleration forces.

It is also an object of this invention to provide a gyroscope assembly having a resilient bearing arrangement at one or more points provided with a spring constant which increases with axial shaft displacement in one direction.

Figure 2:
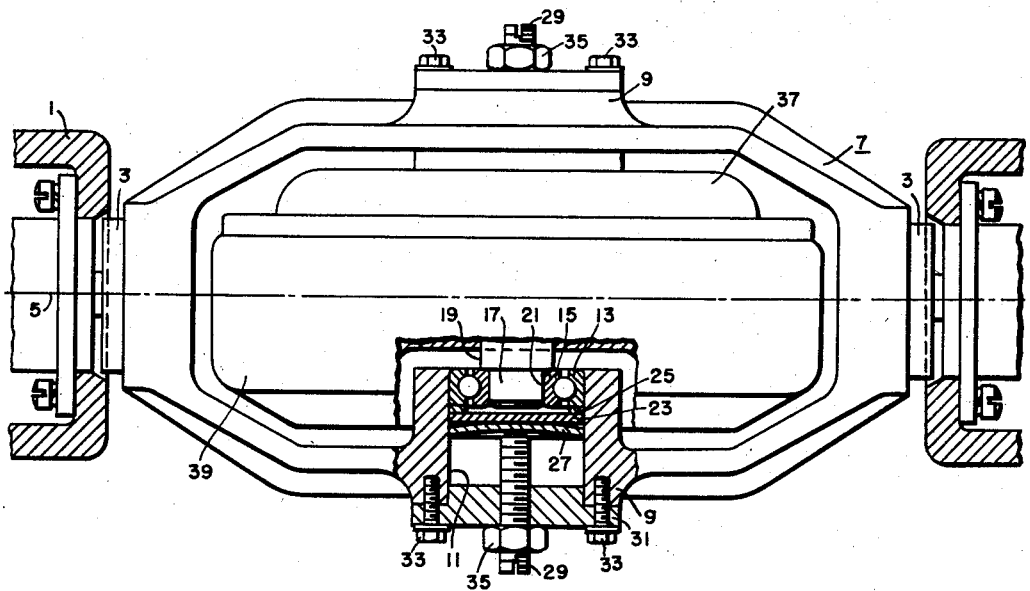

The foregoing statements are merely illustrative of the various aims and objects of this invention. Other objects and advantages will become apparent from a study of the following specification when considered in conjunction with the accompanying drawing in which:

Figure 1 fragmentarily indicates a bearing arrangement embodying the principles of this invention, and Fig. 2 illustrates the application of the bearing arrangement according to this invention in journaling the rotor of a gyroscope.

Referring to Figs. 1 and 2, and with particular reference to Fig. 2, a gyroscope is illustrated having a pair of stationary frame members 1 which may be secured to any suitable type of base (not shown). The stationary frame members 1 mount respective stub shafts 3 defining an axis generally designated 5 for the gimbal 7 in which the stub shafts are journaled. Gimbal 7 is provided with a pair of bosses generally designated 9, the lower of which, as seen in Fig. 2, is illustrated in cross section depicting the general bearing arrangement. Each boss 9 is provided with a circular opening 11 which slidably receives the outer bearing race 13 of a ball bearing assembly having an inner bearing race 15 in which the reduced end 17 of the rotor shaft 19 of the gyroscope is fitted. The reduced end 17 of shaft 19 forms a shoulder 21 which rides against the edge of the inner bearing race 15 to thereby limit axial movement in the inner bearing race. As will be seen from reference to Fig. 2, the reduced end section of the shaft terminates at the lower side of the ball bearing assembly.

This ball bearing assembly is retained in the position shown by means of a novel spring loading arrangement including a flat circular disc or plate 23, the peripheral edge of which rides on a spacer ring 25 which abuts the lower edge of the outer bearing race 13. The circular disc or plate 23 is formed of a suitable thin spring material, such as spring steel, and is preferably substantially flat. The disc 23 is engaged by the convex face of a curved disc or plate 27 which is also fitted in the circular opening 11 of the boss 9 and which is retained in a position such as indicated by means of an adjusting screw 29 which threads through a centrally located hole in a cap 31 which fits over the end of boss 9 and is secured thereto by means of a plurality of bolts 33. The free end of screw 29 engages the concave face of the curved plate or disc 27 substantially at the mid-point thereof. Screw 29 is retained in any one of its adjustable positions by means of a lock nut 35 which threads thereover and seats against the outer face of cap 31. It is to be understood that a similar construction is provided in the upper boss 9. The details of this construction being the same as those illustrated in connection with the lower bosses have not been illustrated in the interest of simplicity. Similar bearing arrangements (not shown) are preferably utilized to journal the gyro gimbal 7 about its axis 5.

As will be appreciated, adjustment of the screw 29 so that its free end is moved towards the end of the gyroscope rotor shaft 19 drives the curved convex face of the curved disc or plate 27 against the substantially flat spring plate 23. Theoretically, when the convex face just touches the cooperating face of spring plate 23, point contact is established. However, when the force is increased by screw adjustment or by axial displacement of the rotor shaft to a point which displaces the peripheral edge of plate 23, deflection of the surface material in contact takes place increasing the contact area. With the occurrence of deflection of the surface of plate 23, which tends to wrap the plate 23 over the convex face of curved plate 27, the spring force increases because the moment arm from the marginal edge of the spring plate 23 to the point of contact of the surface of plate 23 with the convex face of spring plate 27 decreases. Consequently, a non-linear spring characteristic exists in which the spring force increases upon relative displacement between the rotor shaft and the adjusting screw 29 in a sense to reduce the spacing therebetween.

As will be noted from this description, this bearing assembly, which provides adjustable preloading, comprises only four essential parts. During axial loading the area of contact between the convex face of the curved or spherical plate or disc 27 and the face of the flat disc or plate 23 increases, thus inherently reducing the binding stress concentration at the point of contact of the discs. As noted above, at very small values of axial loading, there is essentially point contact between the discs, thus providing a lower spring constant for the system which aids in very delicate adjustment of bearing preload. With the occurrence of large axial loads, such as are encountered during vibration of the gyroscope assembly, the contact between the discs becomes quite large and the spring constant of the system under these conditions is high. With the occurrence of such deflection, both discs become load supporting members and the overall strength of the system is increased substantially.

An additional feature of this device is that it has no inherent resonant frequency. When two such devices are incorporated in a design to retain a mass which is subjected to vibration loading, the displacement is restricted due to a change in the spring constant during displacement. Systems having a fixed spring constant experience large displacements at their resonant frequency. A system which has a changing spring constant, such as that herein disclosed, restricts displacement. Moreover, by reason of the geometry of the contacting surfaces, the device described herein provides a smoothly varying spring constant so that large shock loads are avoided. While curved plate 27 is not described as a spring plate and in this application has been made sufficiently rigid to limit its deflection under load there are applications where resilient deflection of the curved plate may prove desirable.

The gyroscope assembly herein illustrated is similar to that appearing in U. S. Patent 2,416,300 in which F. W. Godsey, Jr. is the inventor and which is assigned to the assignee of this invention. The gyroscope comprises a stator 37 over which is fitted an umbrella type of rotor assembly 39 which is mounted on the rotor shaft 19. The stator assembly 37 is secured in any suitable manner to the gimbal frame 7 in concentric relationship with the axis of the gyroscope rotor, and is equipped with windings adapted for excitation with alternating current, for example, the 400 cycle power conventionally provided on aircraft. The rotor 39 is provided with a laminated armature assembly (not shown) which is linked by flux produced by the stator system and is caused to rotate thereby upon suitable excitation of the stator windings, the motor functioning essentially as a hysteresis motor. Further details of this arrangement may be had by reference to the aforementioned patent.

While but one embodiment of this invention has been herein illustrated, it will be appreciated by those skilled in the art that variations in the disclosed arrangement, both as to its details and as to the organization of such details may be made without departing from the spirit and scope hereof. Accordingly, it is intended that the foregoing disclosure and the showings made in the drawing shall be considered only as illustrative of the principles of this invention and not construed in a limiting sense.

I claim as my invention:

1. A bearing assembly comprising, a ball bearing having inner and outer bearing races, a support having an opening therein slidably receiving said outer race, a shaft having an end fitted in said inner race, means preventing axial movement of said shaft in said inner race, spacer means seated on the axial face of said outer race opposite said shaft, a flat spring member seated on said spacer means, a curved plate having the convex face thereof abutting said flat spring member, and means for applying force against said curved plate in a direction toward the end of said shaft.

2. A bearing assembly comprising, a ball bearing having an outer bearing race and an inner bearing race, a support having an opening therein slidably receiving said outer race, a shaft having an end securely fitted against axial movement in said inner race, a spacer fitted in said opening and seating against an edge of said outer race, a flat spring member fitted in said opening and seating on said spacer, a curved plate having the convex face thereof seating substantially centrally on said flat spring member, and means seating substantially centrally on the concave face of said curved plate for applying axial loads on said spring member toward the end of said shaft.

3. A bearing assembly comprising, a ball bearing having an outer bearing race and an inner bearing race, a support having an opening therein slidably receiving said outer race, a shaft having an end secured against axial movement in said inner race, spring means comprising a first spring plate supported to apply a force against said outer race and a curved plate having a convex face bearing against said first spring plate, and means engaging said curved plate for axially positioning said curved plate.

4. A bearing assembly comprising, a ball bearing having an outer bearing race and an inner bearing race, a support having an opening therein slidably receiving said outer race, a shaft having an end secured against axial movement in said inner race, a substantially flat spring plate supported to apply pressure against said outer race adjacent the end of said shaft, a curved plate having a convex face bearing against the surface of said flat spring plate, an adjusting screw, and means threadedly supporting said adjusting screw with an end thereof against the concave face of said curved plate to adjustably deflect said spring plate and load said ball bearing.

5. A bearing assembly comprising, a bearing member having an outer bearing portion and an inner bearing portion, a support having an opening therein slidably receiving said outer bearing portion, a shaft having an end secured against axial movement in said inner bearing portion and being rotatably mounted thereby, a spring plate member supported adjacent its marginal edges against said bearing member, a curved plate member having a convex face bearing against a surface of said spring plate for providing a moment arm change in said spring plate upon any bearing movement, and means for applying axial force to said curved plate toward said end of said shaft to load said bearing assembly.

6. A bearing assembly comprising, a pair of bearing members each having an outer bearing portion and an inner bearing portion, a support having a pair of coaxially disposed openings respectively receiving said outer bearing portions, a shaft having ends respectively secured against axial movement in said inner bearing portions and being rotatably mounted thereby, a pair of substantially flat spring plate members supported adjacent the marginal edges thereof against said respective bearing members, a pair of curved plate members each having a convex face bearing against the surface of the associated flat spring plate, and respective means for applying axial force to each curved plate toward the ends of said shaft to load each bearing assembly.

7. A bearing assembly comprising, a pair of ball bearings each having an outer bearing race and an inner bearing race, a support having a pair of coaxially disposed openings each slidably receiving one of said outer bearing races, a shaft having reduced end sections fitted in said respective inner bearing races and preventing axial movement of said ball bearings towards each other, a pair of first spring plates supported adjacent the marginal edges thereof against said respective outer bearing races, respective curved spring plates each having a convex face seated against a surface of the corresponding one of said first spring plates, and means engaging each curved spring plate for applying forces thereto toward the ends of said shaft to load said respective ball bearings.

8. A gyroscope assembly comprising, a frame, respective bearings journaling opposite ends of said frame for rotation about a given axis, a rotor, respective bearings journaling opposite ends of said rotor in said frame, rotor rotating means, and respective non-linear spring means disposed to axially bias at least one set of said bearings to apply axial loads to said rotor, said non-linear spring means comprising a substantially flat spring plate having a peripheral marginal portion positioned to apply a pressure to a bearing, a curved plate having a convex face centrally engaging said spring plate, and means securing said curved plate against axial movement.

9. A gyroscope assembly comprising, a frame, a rotor having a shaft, rotor rotating means, bearings slidably mounted in said frame and journaling said shaft, means limiting axial movement of said shaft in said bearings, and non-linear spring means engaging each bearing and biasing each bearing toward said rotor, each non-linear spring means comprising a substantially flat spring plate having a peripheral marginal portion supported to apply a pressure to the associated rotor bearing, a curved plate having a convex face centrally engaging said spring plate, and means securing said curved plate against axial movement.

References Cited in the file of this patent

UNITED STATES PATENTS

| | | |
|---|---|---|
| 698,286 | Irving | Apr. 22, 1902 |
| 2,199,024 | Carter | Apr. 30, 1940 |
| 2,352,469 | Carlson | June 27, 1944 |
| 2,416,300 | Godsey | Feb. 25, 1947 |
| 2,605,641 | Barkalow | Aug. 5, 1952 |
| 2,737,815 | Wikkenhauser | Mar. 13, 1956 |

FOREIGN PATENTS

| | | |
|---|---|---|
| 746,217 | Germany | June 17, 1944 |
| 299,810 | Great Britain | Dec. 17, 1929 |